United States Patent
Piercey, III

(10) Patent No.: US 9,315,141 B1
(45) Date of Patent: Apr. 19, 2016

(54) LOAD SUPPORT CARRIER AND METHODS OF USE

(71) Applicant: Gerald S. Piercey, III, Glendale, AZ (US)

(72) Inventor: Gerald S. Piercey, III, Glendale, AZ (US)

(*) Notice: Subject to any disclaimer, the term of this patent is extended or adjusted under 35 U.S.C. 154(b) by 0 days.

(21) Appl. No.: 14/120,818

(22) Filed: Jun. 30, 2014

(51) Int. Cl.
| | |
|---|---|
| *B60D 1/155* | (2006.01) |
| *B60P 3/40* | (2006.01) |
| *B60D 1/48* | (2006.01) |
| *B60D 1/30* | (2006.01) |
| *B60G 3/14* | (2006.01) |

(52) U.S. Cl.
CPC . *B60P 3/40* (2013.01); *B60D 1/155* (2013.01); *B60D 1/30* (2013.01); *B60D 1/481* (2013.01); *B60G 3/145* (2013.01)

(58) Field of Classification Search
CPC ............ B60P 1/025; B60D 1/155; B60R 9/06
USPC ............... 280/482, 414.5, 407, 401; 224/518, 224/519, 520
See application file for complete search history.

(56) References Cited

U.S. PATENT DOCUMENTS

| | | | | |
|---|---|---|---|---|
| 3,753,579 A | * | 8/1973 | Kurilich, Jr. | ................. 280/400 |
| 6,533,337 B1 | * | 3/2003 | Harshman et al. | ......... 296/26.08 |
| 6,733,028 B2 | * | 5/2004 | Teeple | ........................ 280/476.1 |
| 6,820,887 B1 | * | 11/2004 | Riggle | ........................ 280/476.1 |
| 6,834,902 B2 | * | 12/2004 | Agan | ........................ 296/26.08 |
| 7,641,235 B1 | * | 1/2010 | Anduss | .......................... 280/769 |
| 8,246,067 B1 | * | 8/2012 | Flathers | ..................... 280/476.1 |
| 2004/0207173 A1 | * | 10/2004 | Krauss | ........................ 280/414.5 |
| 2010/0038391 A1 | * | 2/2010 | Cumbie | ......................... 224/502 |
| 2011/0024473 A1 | * | 2/2011 | Weiss | ............................. 224/500 |

* cited by examiner

*Primary Examiner* — Tony Winner
*Assistant Examiner* — Marlon Arce
(74) *Attorney, Agent, or Firm* — Charles E Runyan; Albert W Davis, Jr.

(57) ABSTRACT

A load bearing carrier system for carrying additional cargo in the vehicle or on the carrier itself. The support system increases the wheelbase of the vehicle to stabilize the added weight and extended weight out the back of the vehicle at high speeds. The load bearing structure attaches to the tow vehicle at trailer hitches or directly to the frame of the vehicle. The system includes a receiver hitch or a multiple receiver hitch beam attached across the rear of the tow vehicle attached to the tow vehicle frame. The carrier mounting beam has trailer tongues pinned into said receivers and the attached mounting beam of the carrier has vertical beams near each end to mount the springs, air bags, air shocks, load bearing air cylinders or spring enhanced shocks type of suspension, the cargo platform and attached trailer hitch. The mounting beam has pivot beams to mount the spindles, hubs, brakes, wheels and tires. The suspension forces the pivot beams, spindles or axles, hubs, wheels, and tires to the ground lifting the carrier, cargo, cargo deck, truck, and trailer hitch attached to the cargo deck upward in a load bearing manner.

16 Claims, 10 Drawing Sheets

LOAD SUPPORT CARRIER AND METHODS OF USE

CROSS-REFERENCE TO RELATED APPLICATIONS

This application is related to provisional patent application Ser. No. 61/957,363 filed Jul. 1, 2013 by Gerald S. Piercey III for Load Support Carrier.

FIELD OF THE INVENTION

The present invention relates generally to a load bearing device that attaches to the rear of a car, truck, off road vehicle, that relieves the weight of additional cargo on an extended cargo platform or helps carry the weight of the vehicle itself while pulling a trailer as well as increasing wheelbase and high speed stability. The added wheels at the extreme rear of a vehicle stabilize the vehicle. The introduction of short bed trucks has created a need for cargo deck extension and carrier load sharing with the truck as well as pulling trailers.

DESCRIPTION OF PRIOR ART

The prior art seems to focus on wheeled devices with very little travel on poor roads. The forces on the hitches or frames of vehicles using wheeled support systems are extreme when there is little travel upward and downward. Lacking is a wheeled support carrier that allows for cargo to be loaded up the center of the bed of the truck and yet has a low profile and low weight. Also lacking is the combination of excellent wheel travel and a low center of gravity cargo platform that carries the added weight with stabilizing efficiency due to the width of the carrier wheels. Also lacking is the ability to extend the short truck bed area to the rear for longer loads and support additional weight. This departure from prior art is critical in load safety. The prior art lacks a carrier for smaller cars with weaker frames and hitches.

SUMMARY OF THE INVENTION

This invention is a load bearing cargo carrier that mounts to a quality hitch or a unique hitch mounting beam across the rear of all types of four plus wheeled vehicles without the driving characteristics of pulling a trailer and still pull a trailer while carrying a cargo on the carrier. All embodiments use basically the same type of components, suspensions and the same concepts with different uses and applications.

The primary object of the first embodiment focuses on large vehicles as well as small cars that need the platform deck across the rear to perform the function carrying cargo or of extending the short truck bed or small truck bed while being capable of pulling a trailer. This embodiment has two wheels.

The second embodiment of the invention is to provide a platform on the carrier that functionally extends the car cargo capability or truck bed outward to the rear with load bearing capability and stability. This allows for long heavy loads without upsetting the balance and handling of the vehicle. This embodiment may be a single or two wheeled carrier.

The third embodiment of the invention provides for sideways loading systems on the weight bearing carrier for cargo, machinery or motorcycles.

The forth embodiment of the invention demonstrates the rotational hinge providing for very limited rotation of the carrier in relation to the tow vehicle to limit tire wear. This limited rotational flexibility comes with anti-sway and simple backing up functionality. The last embodiment also solves the loading issue by the carrier allowing a open center area to load motorcycles, jet skis, snowmobiles, yard tractors and machinery using loading systems with track type or telescoping structures as well as carrying some of the cargo load on a extended wheel base or cargo deck shown in other embodiments.

BRIEF DESCRIPTION OF THE DRAWINGS

FIG. 2 B is a rear end view of another embodiment showing the single wheel (could also be two wheels) without air suspension and without the cargo deck or towing ball, but includes the loading system for loading a motorcycle or other equipment.

DETAILED DESCRIPTION OF THE DRAWINGS

Figure 1:
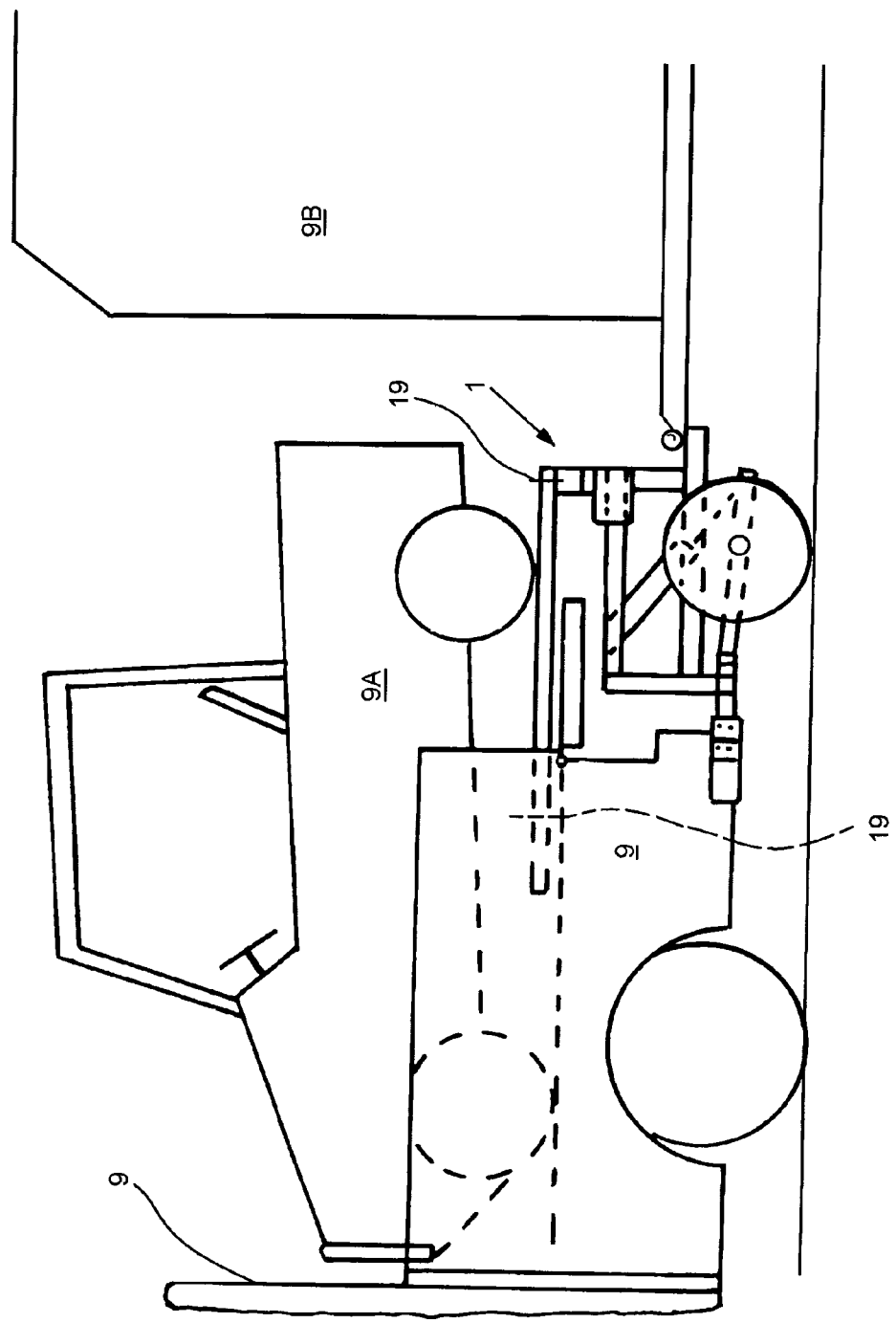
FIG. 1 is a side view of a short bed pickup truck with a load support carrier tongue inserted into the receiver hitch on the truck. The bed of the truck has a segment of deck extension over-lapping the tailgate and rear portion of the truck bed. The carrier is supporting the deck extension and the ATV sticking out the rear of the short pickup bed. The trailer is hitched to the carrier ball at the rear of the carrier and supported by the carrier suspension.

FIG. 1 demonstrates the short bed truck 9 with the cargo 9A placed with the front weight of the AN 9A exclusively on the truck and the rear of the cargo or AN 9A over the carrier suspension. The cargo deck does not move up and down with the suspension The tongue (s) 15 of the carrier is pinned into the receiver (s) 14 of the tow vehicle creating a ridged vertical connection between the tow vehicle and the carrier. The trailer 9B rests its tongue weight on the ball of the carrier exclusively and has no sway characteristics due to the short distance to the carrier axle and the ridged connection to the truck or anti-sway in the rotational models.

Figure 2:
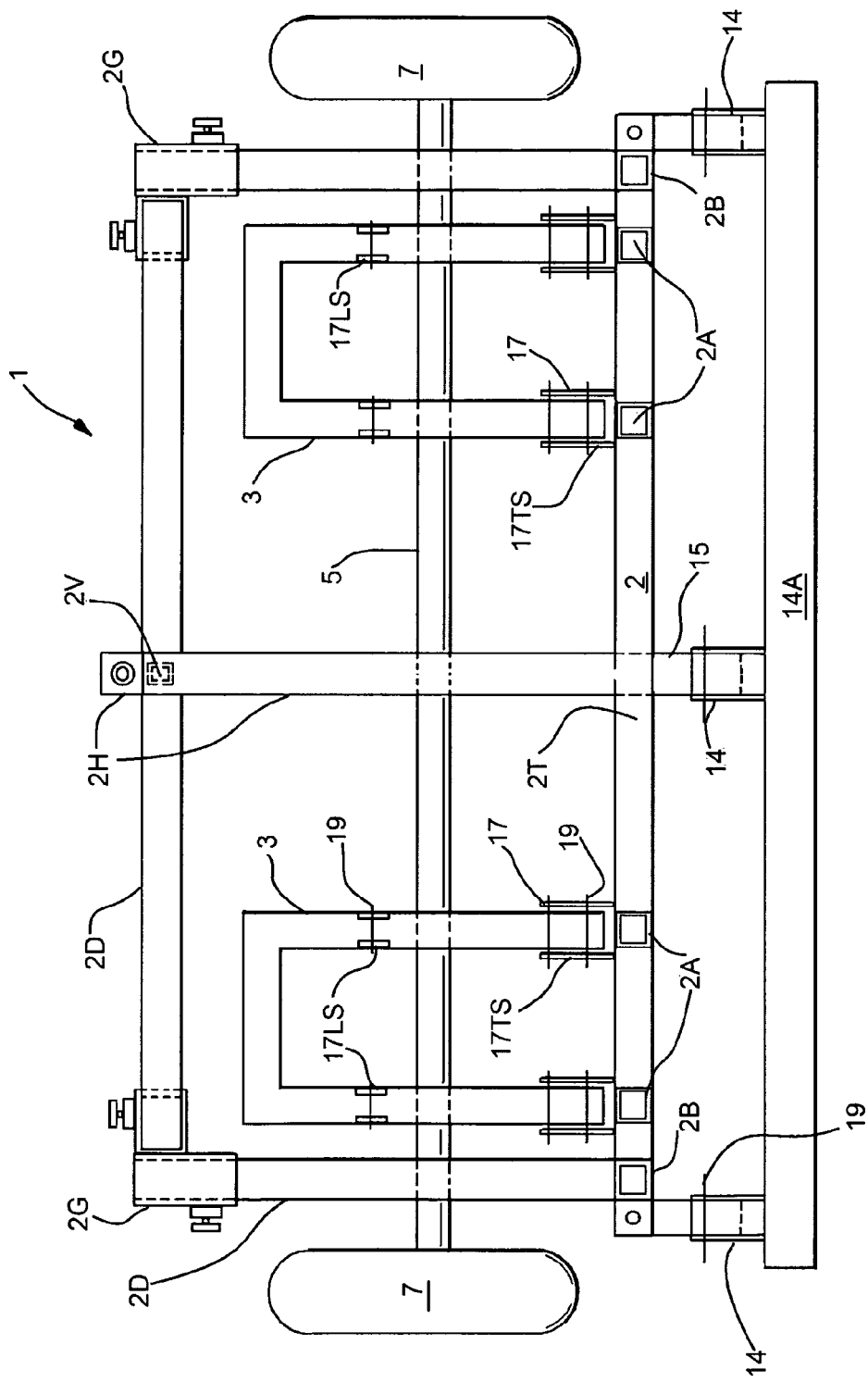
FIG. 2 is the top view of one embodiment of the load support carrier shown without the air suspension cylinders or air ride shocks. This embodiment shows a straight thru axle and two pivot beams, two sets of air suspension devices, and two tires.

FIG. 2 shows the receiver mounts 14 on the tow vehicle with the tongues 15 pinned into place thereby securing the mounting base beam 2 in a ridged fashion to the tow vehicle. The tabs 17 on the mounting base beam 2 mount the pivot beams 3 in a manner that the pivot beams 3 can only rotate up and down but never sideways (horizontally). The axle 5 or spindle 5 is secured to the pivot beams 3 showing suspension 16 FIG. 3 with mounting tabs 17LS securing the lower end of the suspension to the pivot beams 3 in all cases and all embodiments. The vertical structural beams 2B attached to mounting base beam 2 extend upward to provide proper height for the attached structural cargo beam 2D to provide the extension rearward to mount 2C to the rear for cargo and cargo deck CD extensions and receiver hitches 2V, 2H 14 for trailer towing. Adjustable mounting brackets 2G mount the cargo deck CD in an adjustable manner for movement from vehicle to vehicle. Upper suspension mounting tabs 17TS mount the top end of the air suspension units to the structural vertical suspension mounting beams 2A, 2T in a plurality of mounts.

Figure 2A:
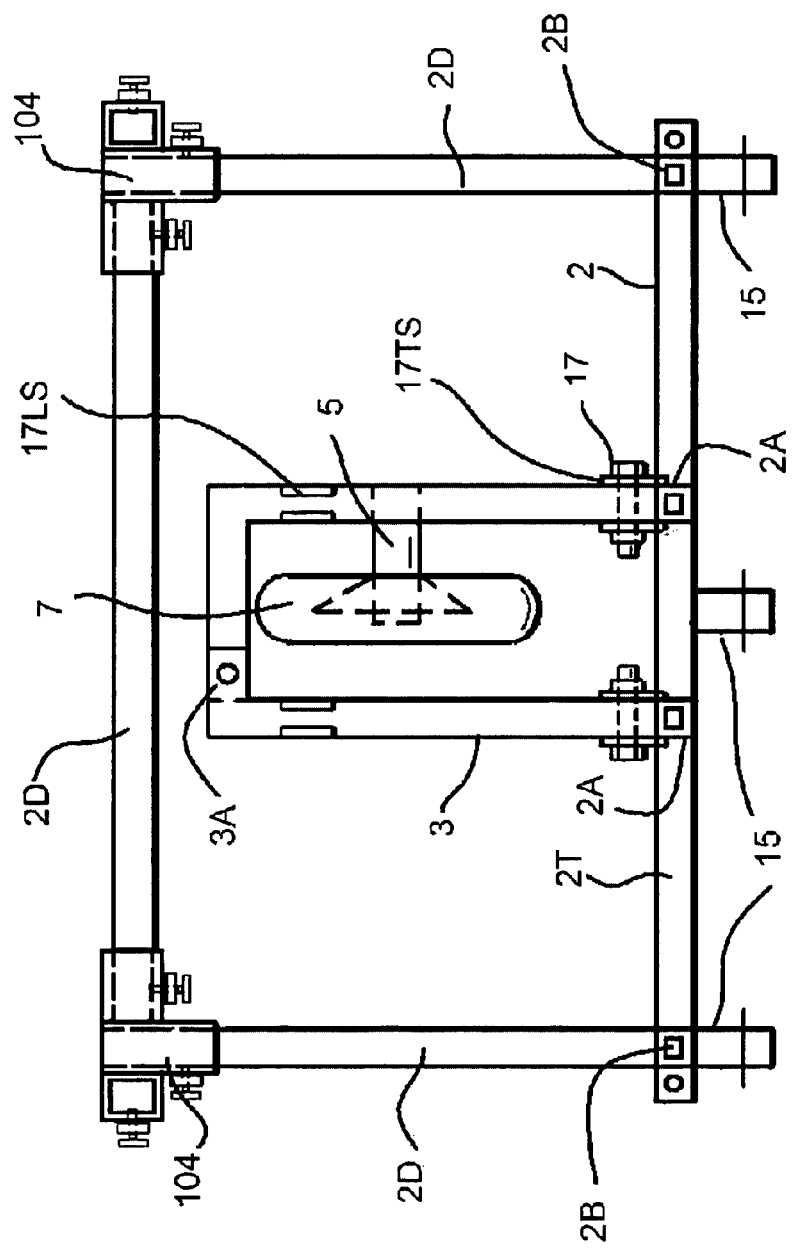
FIG. 2A is the top view of another embodiment showing the single pivot beam, single tire, and single set of air suspension tabs without the air cylinders, air shocks.

FIG. 2A clearly demonstrates the single wheel load bearing carrier with trailer tongues 15 to connect to the tow vehicle and mounting base beam 2 to mount the pivot beams 3 with tabs 17 and bolts 19 for vertical rotation only. Spindle 5 attached to pivot beam 3 mount the wheel and tire 7 as well as lower suspension tabs 17LS for the lower end of the air ride suspension with the upper end of the suspension mounted to tabs 17 TS on vertical beam 2A secured between lower mounting base bean 2 and upper mounting beam 2T. Pivot beam 3 shows disassemble point 3A for changing tires, bearings. Structural vertical beams 2B raise up and mount the cargo carrying beams 2D at the proper height to match the truck bed or for lower cargo center of gravity positions. Brackets 2G, 104 provide for vertical cargo deck height adjustment as well as securing all three cargo beams 2D in a structural manner. Optional trailer hitch 2V, 2H, 14 not shown in this diagram for clarity.

Figure 2B:
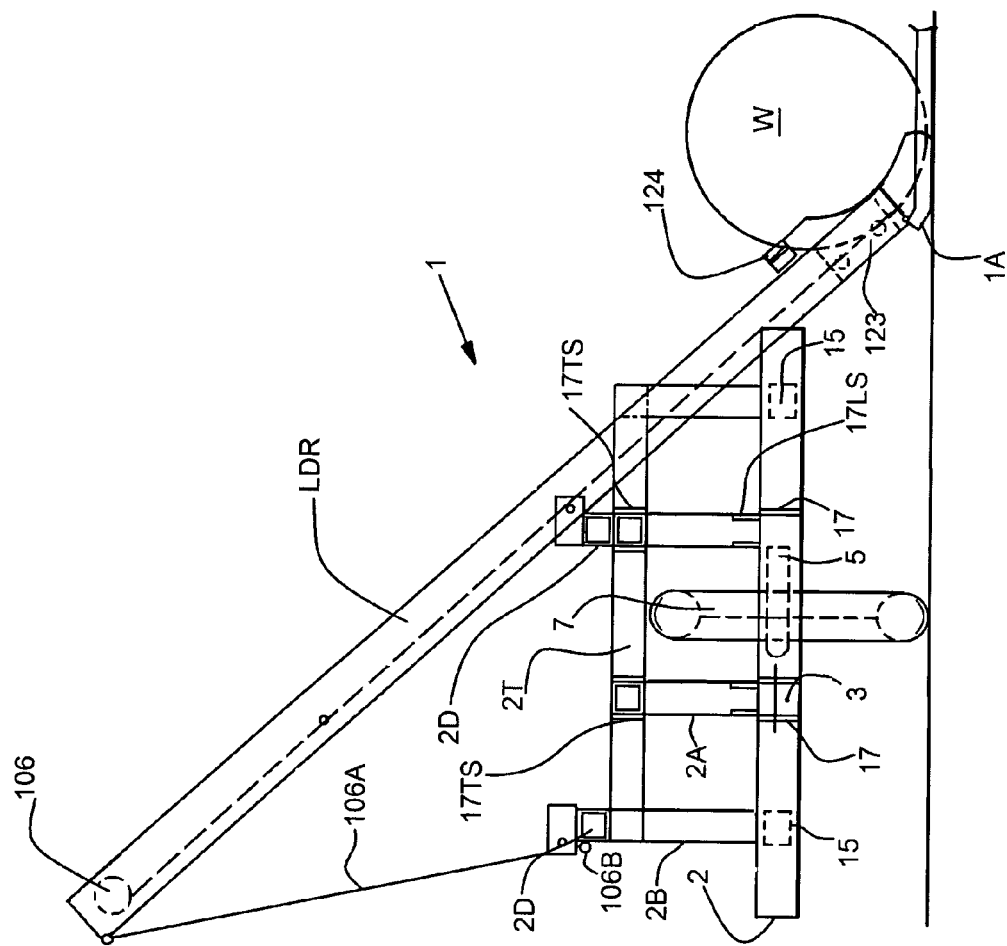

FIG. 2B provides for mounting the motorcycle loading system 1 across the carrier to load and unload the cycle on a lowered mounting platform without cargo deck but using structural vertical beams 2B and horizontal top structural beam 2T and cargo beams 2D to mount the loading system. As with all of these embodiments the tongue of the carrier is pinned into the receiver on the tow vehicle securing the mounting base beam 2 to the vehicle with the pivot beam tabs 17 mounting the pivot beams in a vertically rotational system for the mounting of the spindle, wheel and tire 7. The suspension mounting tabs 17LS on pivot beam 3 and upper suspension tabs 17TS with suspension means disposed between pivot beam 3 and vertical suspension mount beams 2A. This carrier does not rotate since the huge weight at the extreme rear of the vehicle must be stable at high speeds and the correct tires exhibit little tire wear in normal use.

Figure 3:
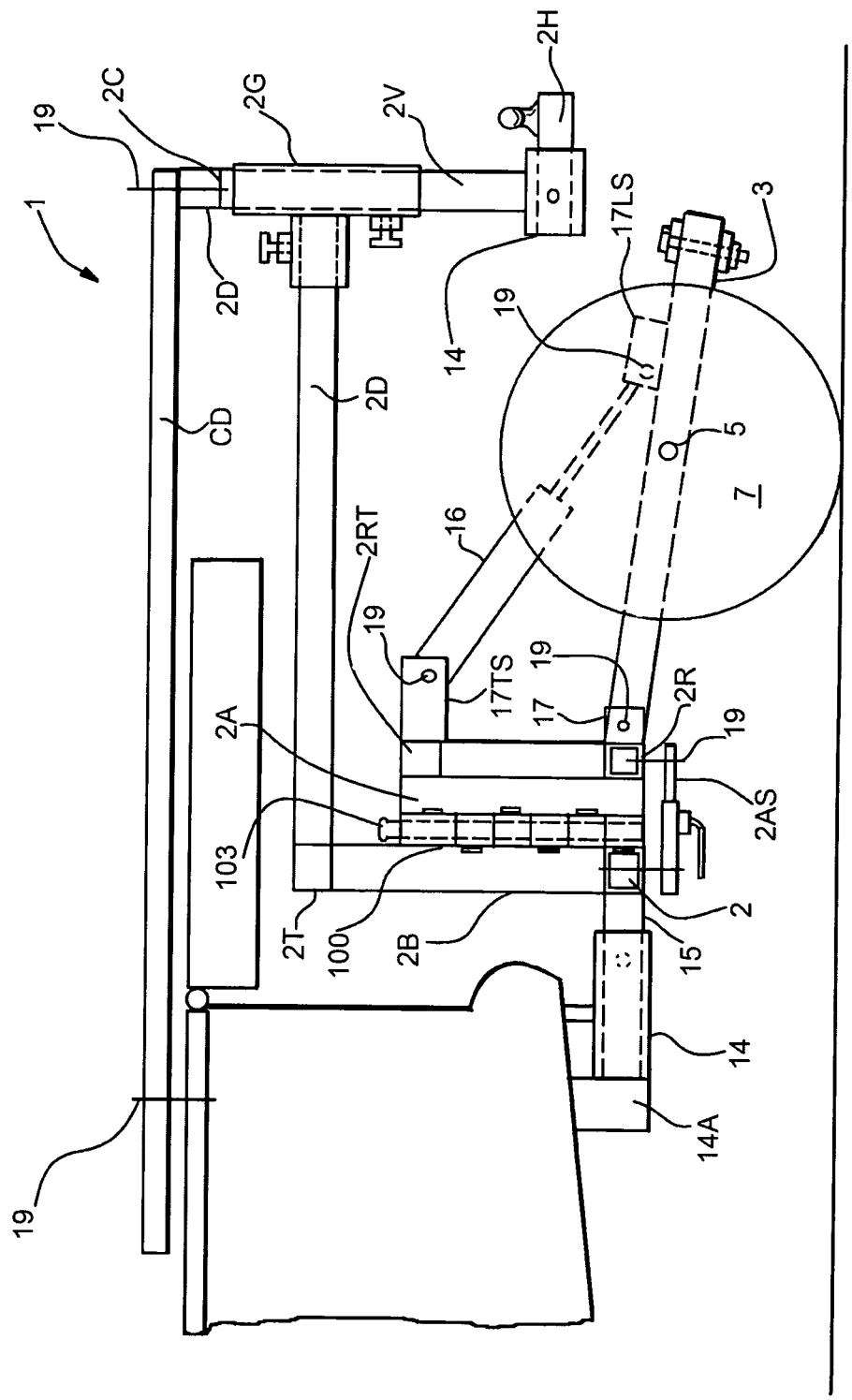
FIG. 3 is the side view of the load support carrier with a hinged and limited horizontal rotation capability. all previous embodiments in this patent could have the limited rotation with anti-sway added.

FIG. 3 demonstrates the rotational hinge added to the previous FIG. 1 thru FIG. 8 with the ability to decrease tire wear in commercial use. The limited rotation does not scuff tires in normal cornering but only in backing up and with the anti-sway has excellent stability at high speeds.

The receiver hitch mount beam 14A mounts to the frame of the tow vehicle 9 with the tongues of the carrier 15 pinned into place securely thus mounting the mounting base beam 2 to the vehicle. The vertical center beam mounts the hinge system to the mounting base beam 2 and the top mounting beam 2T to be perfectly centered and structurally sound to transfer the load of the load beams, cargo deck, receiver hitch to the hinge and limited rotation vertical beams 2A, lower rotating mounting base beam 2R and upper beam 2RT as well as a plurality of pivot beams 3 and a plurality of suspension mounts 17TS, 17LS and a plurality of load bearing air suspension cylinders or load bearing air shocks. The structural vertical beams 2B mount the structural horizontal cargo beams 2D as well as mounting bracket 2G providing for cargo deck CD and receiver hitch beam 2V receiver 14. The vertical suspension mount beams 2A, suspension tabs 17TS mount the suspension at the top and the pivot beam tabs 17 mount the pivot beams 3 with lower suspension tabs 17LS providing suspension means disposed between the numerous vertical beams 2A and the numerous pivot beams 3. The cargo deck or cargo loading systems are height adjustable to match up with the bed of the truck or rear of a car. The cargo deck extends the bed of a short bed truck extensively and still pulls a trailer. The plurality of tires, pivot beams, air suspension systems, and structural beams increases the load capability of the tow vehicle and stability due to longer effective wheelbase.

Figure 4:
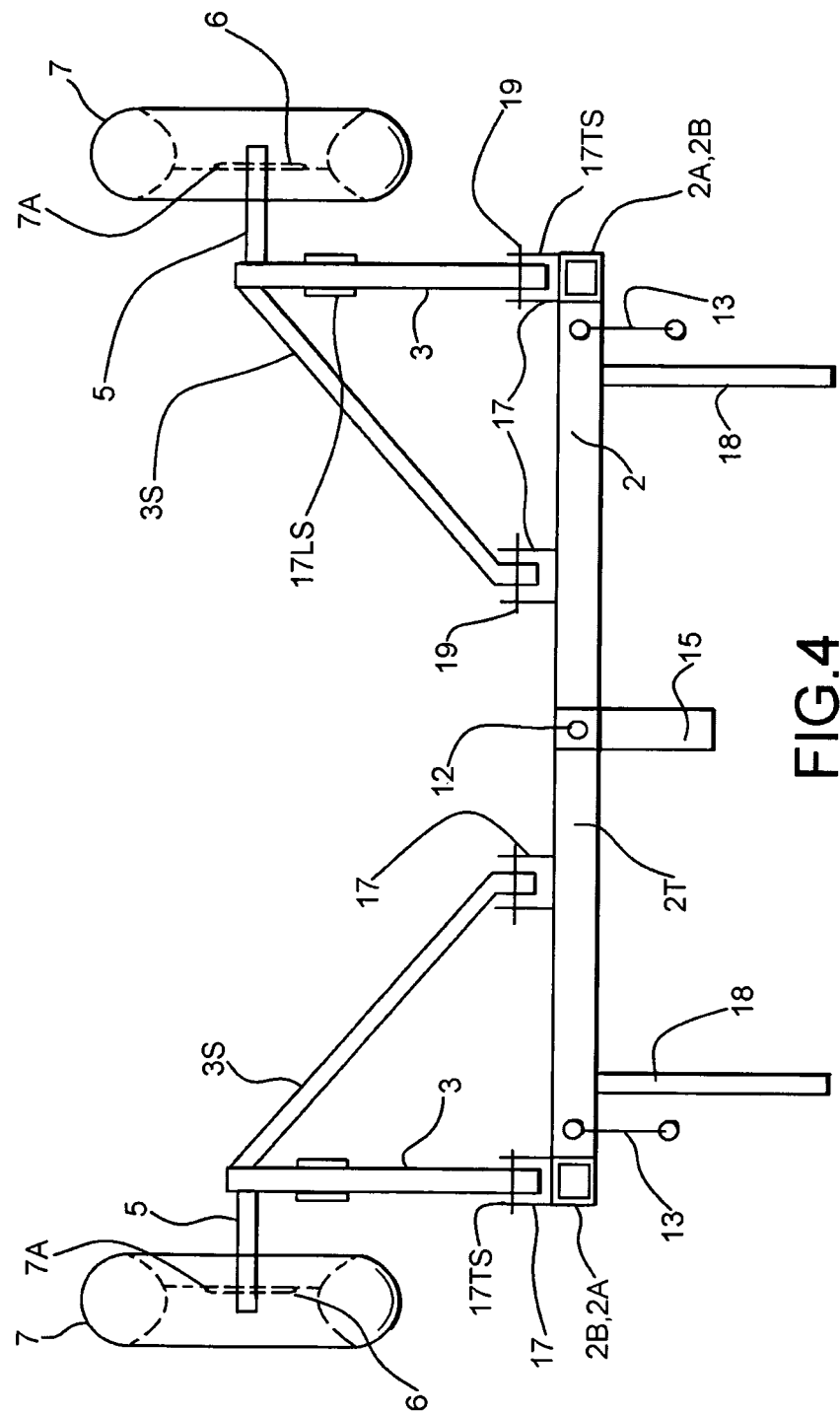
FIG. 4 is a top view looking down on the rear of the vehicle showing the wide open center of the load bearing system, with the cargo beams and deck omitted for clarity.
Figure 5:
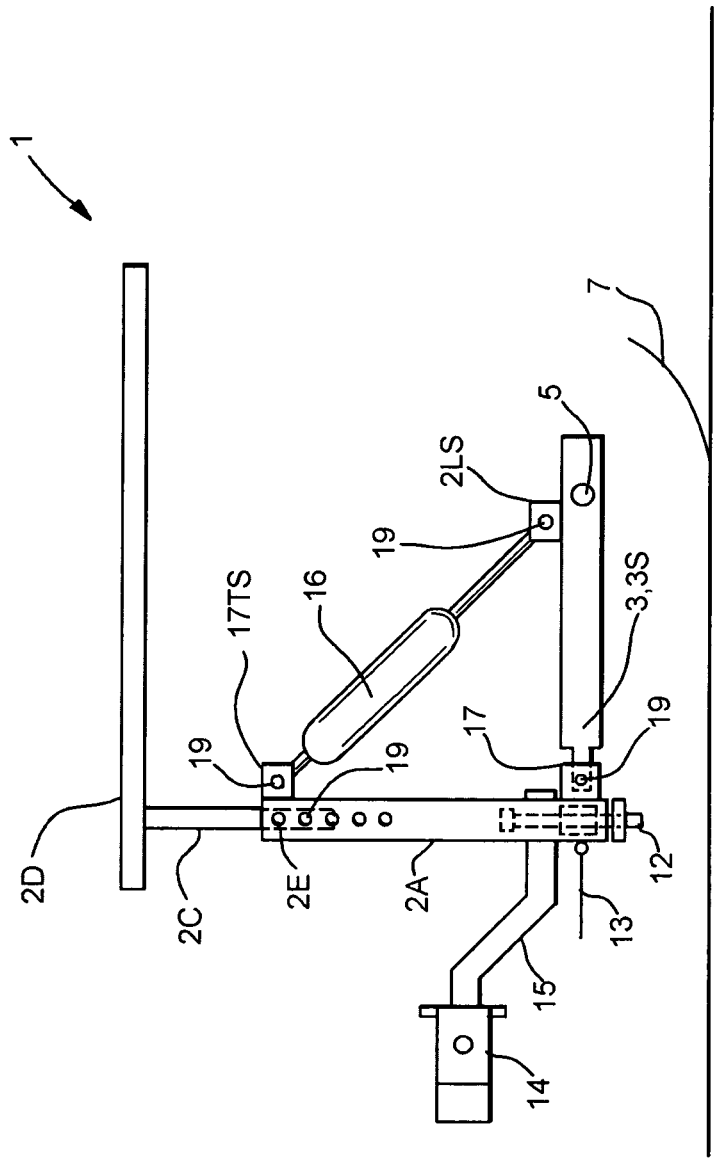
FIG. 5 is the side view showing the vehicle hitch (s), the adjustable tongue in the receiver hitch, the air shock or air cylinder mounted diagonally to increase travel, and the removable cargo platform mounted directly to the load bearing system. This drawing also demonstrates the ability to have the platform adjust to bed height of a truck for long loads such as pipe or lumber or ATV's.
Figure 6:
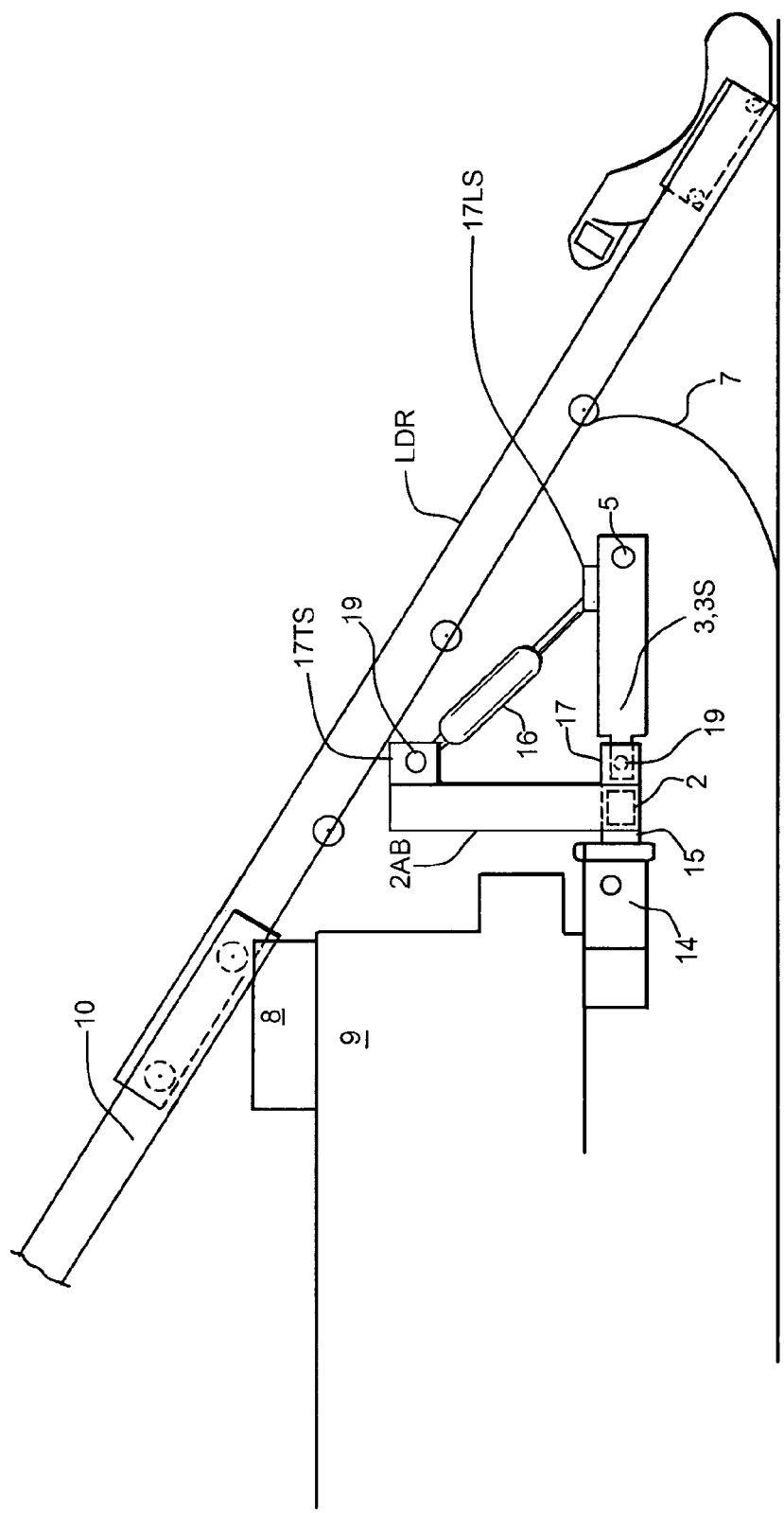
FIG. 6 shows the truck with track type loading system ready to load a motorcycle, machinery, pallets, bins and smart car as well as the compact nature of the carrier and simplicity of it's function.

FIG. 4 through FIG. 6 illustrate the vehicle support system in this embodiment to demonstrate the wide mounting that can line up with all vehicle frames at the rear of the vehicle.

FIG. 4 is the top view giving perspective to the open center area necessary for many cargoes. In this embodiment the carrier stabilizes the cargo weight to prevent sway in short vehicles. The wide stance of the invention also creates a foundation for the top mounted platform not shown for clarity by supporting both sides at the sides of the vehicle. Custom frame mounts 18 14 are stronger and better positioned to mount directly to the vehicles frame or the use of trailer tongues 14. The wide mounting base 2 provides for the ability to place the custom mounts in the proper location to match up with the vehicle frame and attach to the vehicle frame. When using the custom mounting brackets 18 or receiver hitches 14, the mounting base 2 may remain on the vehicle and six pins 19 or bolts remove the pivot beams 3 and suspension units 16 in moments leaving the mounting base 2 in place and ready for the next cargo. Trailer tongue 15 or multiple custom tongues 18 or 14 FIG. 2 with a plurality of industry standard tongue type hitches slides into the receiver of the vehicle which is attached to mounting base beam 2 to adjust height when changing vehicles. Mounting beam 2 has a plurality of mounting plates 17 providing for structurally mounting the pivot beams 3 on both ends of the mounting beam 2. Spindle 5 is securely mounted to pivot beam 3 for full cargo carrying capability. Wheel hub 6 is secured to spindle 5 and wheel 7A and has tire 7 secured to wheel 7A. The air support suspension is omitted in this view for clarity.

FIG. 5 is the side view of the mounting to a receiver hitch (s) with a trailer tongue 15 that curves downward. The use of industry standard trailer tongues allows the user to change vehicles without having to have custom trailer tongues made special. The trailer tongue 15 is bolted to the mounting beam 2 in the center for balance and structural integrity. The side view shows the pivot beams 3 in the horizontal position in the center of the travel of the load bearing air cylinder or air shock 16 for great travel both up and down. The pivot beams 3 are pinned 19 or bolted into mounting plates 17 mounted on the mounting beam 2 and the vertical mounting beams 2A demonstrate the mounting of the cargo platform 2C and 2D as well as the upper mounting of the air suspension mounting plates 17. The pivot beams also mount the lower end of the air suspension units at plates 17LS and bolts 19. The vertical mounting beams 2A with one on each side or more of the vehicle is the mounting point for the top mounted platform 2D and is vertically adjustable 2E for various cargoes. The size of the platform is based on the cargo and vehicle size, as well as the strength of the vertical beams 2A, 2C and 2D. Stabilizing cable 13 attaches to the mounting beam 2 on each end as well as the vehicle frame on each end using cable winches or turn buckles or chains.

FIG. 6 is the side view showing the typical loading system 10, 1 for motorcycles, jet skis, snowmobiles, yard tractors, and other machinery mounted to vehicle 9 through receiver hitches 14 possible on hitch beam 14A, FIG. 3. It is obvious that the open center invention FIG. 1 is necessary to load many cargoes. Of great importance is the travel of the pivot beam 3 in this view by changing the size of the mounting base 2A and the length of pivot beam 3 and the adjustable load bearing air cylinders or air shocks 16, air bags, air springs, struts, and spring mounted shock absorbers. The trailer tongue 15 can be increased to three trailer tongues in severe operating conditions or extreme loads. The side view helps understand the stability produced by non steering wheels 7 at the far rear end of the vehicle with the relatively increased wheel base of the vehicle.

Figure 7A:
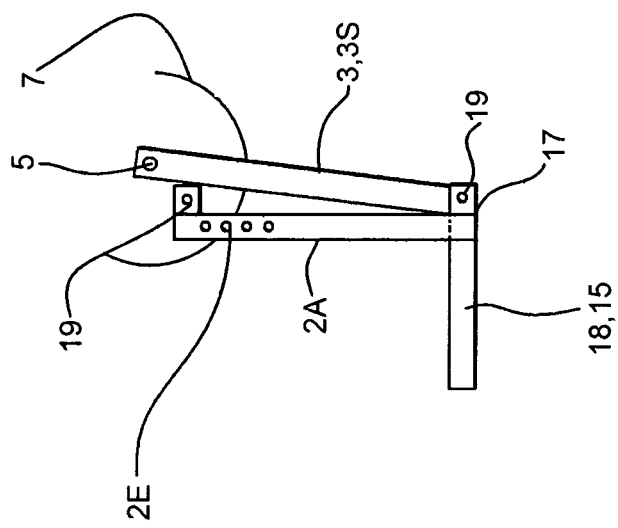
FIGS. 7 and 7A shows the stored position of the pivot beam in an upright position.
Figure 7:
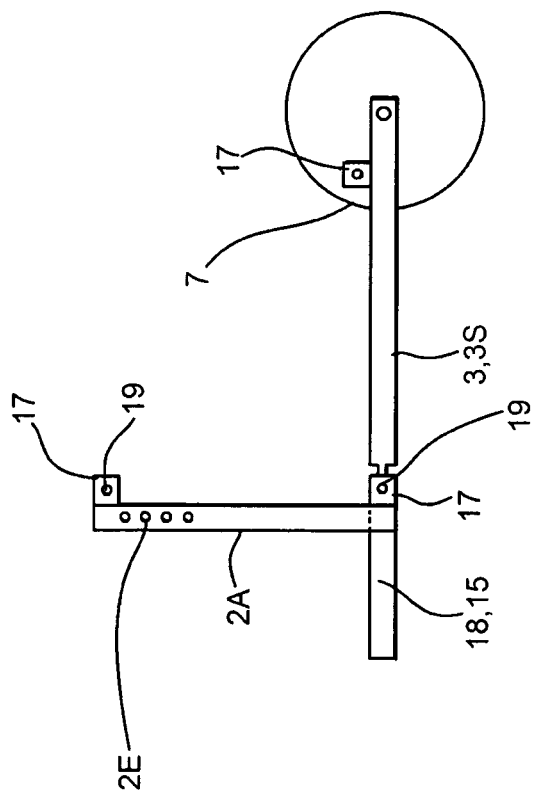

FIG. 7, 7A is the representation of the storage position of pivot beam 3 with suspension units unpinned and set aside. The pin 19 is placed in the upper mounting plates 17 through the mounting plates 17 on the pivot beams 3 to secure in the upright position. The tire 7, wheel 7A, hub 6 normally do not have to be removed to store in this manner. Due to the fact that pivot beams left 3 and right 3 are separate, they are light enough in small applications to be lifted by hand.

Figure 8:
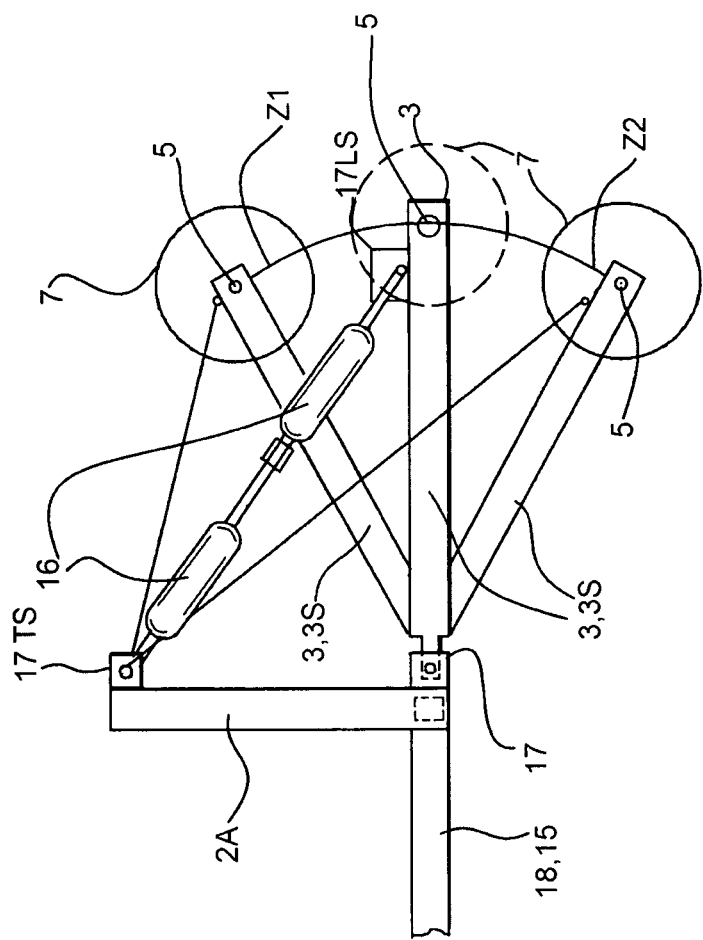
FIG. 8 defines the extreme travel of the invention using multiple air suspension units in a series configuration with one suspension unit attached to another in a straight line. Also demonstrated is the longer components producing greater travel in the suspension.

FIG. 8 is the description of the suspensions 16 in series and pivot beams 3 in the extreme up Z1 and extreme down Z2 position. The arc or radius drawn by Z1 to Z2 is the path of the spindle 5 as the suspension system functions in extreme dips or driveways allowing the system to avoid bottoming out and putting damaging force on the mount hitch 14 or mounting brackets 18 or the vehicles hitches or frame. Also visible is the longer vertical beam 2A and the longer pivot beam 3 adding to vertical travel in the up and down direction. The structure of pivot beam 3 militates against horizontal movement thus eliminates sway of the added rear load.

I claim:

1. A carrier comprising:
    a carrier mount;
    one or more shanks connected to the carrier mount and adapted to connect the carrier mount to a vehicle frame by engaging the shank or shanks into one or more receivers mounted to the vehicle frame or to a receiver beam mounted across the back of the vehicle;
    vertical suspension mounts that extend vertically from connections located near each end of the carrier mount;
    one or more horizontal pivot beams attached to the carrier mount near the ends of the carrier mount;
    one or more spindles or axles mounted to the horizontal pivot beams;
    wheel components mounted to the spindles or axles;
    suspension components having lower ends attached to the horizontal pivot beams, having one or more length, width, or height adjustments wherein the components are any one or any combination of load bearing springs, air shocks, spring shocks, pneumatic piston units, and airbag suspensions;
    one or more structural vertical beams extending upward from the carrier mount;
    one or more cargo beams attached to one or more vertical structural beams near or at the top of the vertical beams;
    a cargo loader or a cargo deck connected over the cargo beam or beams wherein the cargo deck is positioned to extend a cargo surface of the vehicle; and
    one or more hitches,
    wherein the carrier is capable of assuming a storage position that raises the wheel components.

2. The carrier of claim 1 wherein the suspension components connect to one or more vertical suspension mounts.

3. The carrier of claim 2 wherein the suspension is adjustable with air pressure.

4. The carrier of claim 1 wherein one or more horizontal pivot beams resist horizontal movement.

5. The carrier of claim 4 wherein one or more horizontal pivot beams prevent horizontal movement.

6. The carrier of claim 5 having two wheels mounted on two separate spindles wherein each spindle connects to two horizontal pivot beams at the first ends of the horizontal pivot beams and connect to the carrier mount at the second ends of the horizontal pivot beams.

7. The carrier of claim 6 wherein the cargo loader comprises a platform pivotally mounted to the carrier through one or more of the structural vertical beam or beams, the horizontal top structural beam or beams, and the cargo beam or beams.

8. The carrier of claim 7 wherein
    a first end of a post attaches to the platform at substantially 90 degrees and the post comprises a series of holes bored through a pair of opposing sides beginning at a second post end;
    one or more of the vertical structural beams comprise a series of holes bored through a pair of opposing sides beginning near the upper end of the vertical structural beams;
    and
    a bolt adapted to simultaneously pass through the holes in the vertical structural beams and in the post.

9. The carrier of claim 7 further comprising a rear bracket and a post wherein:
    one of the structural cargo beams, aligned with the middle of the carrier, connects to one of the structural vertical beams at a first end, and extends rearward;
    the rear bracket mounts to a second end of the structural cargo beam;
    and
    the first end of a post attaches to the platform at substantially 90 degrees and connects to the structural cargo beam through the rear bracket.

10. A carrier comprising:
    a mounting base beam comprising shanks adapted to slide into receivers attached to a vehicle;
    a vertical center beam attached to the mounting base beam;
    a hinge system attached to the vertical center beam;
    a top melting beam attached to the vertical center beam;
    a limited rotation vertical beam mounted to the hinge system;
    a lower rotating mounting base beam mounted to the limited rotational vertical beam;
    pivot beams attached to the limited rotation vertical beam;
    an upper rotational beam attached to the limited rotational vertical beam;
    suspension system attached between the limited rotational vertical beam and the pivot beams;
    one or more wheels attached to one or more pivot beams
    a structural horizontal cargo beam attached to structural vertical beam at a first end and extending rearward from the vehicle;
    a rear bracket attached to a second end of the structural horizontal cargo beam;
    a platform;
    a post attached to the platform at substantially 90 degrees wherein the post slides into the rear bracket.

11. A carrier comprising:
a mounting base beam comprising shanks adapted to slide into receivers mounted on a vehicle wherein the mounting base beam is attached to vertical beams and horizontal cargo supporting beams;
a cargo deck attached to the vertical beams and horizontal cargo supporting beams;
one or more pivot beams attached to the mounting base beam so as to limit horizontal motion of the one or more pivot beams, which increases trailer stability;
a suspension means dispose between an end of a pivot beam and the vertical beam or horizontal cargo beam in a load-bearing manner wherein the suspension means is adjustable and provides extreme up-and-down travel to the pivot arms beams;
one or more spindles or axles mounted to the pivot beams; and
one or more wheels attached to the spindles or axles bearing the cargo and trailer tongue weight.

12. The carrier of claim 11 wherein the cargo deck is on the same level as the bed of the vehicle and has a width the same as or different from the bed width wherein a cargo loading mechanism is mounted on the cargo deck and wherein the cargo deck holds the cargo while the vehicle pulls the trailer.

13. The carrier of claim 12 wherein the mounting base beam, vertical beams, pivot beams, spindles, axles, wheels, tires, suspension means, and an anti-sway device are designed to limit horizontal motion.

14. The carrier of claim 13 further comprising a receiver mounting beam connected to the vehicle frame and connected to the receivers.

15. The carrier of claim 14 wherein the shanks are slid into the receivers on the vehicle.

16. The carrier of claim 15 wherein the cargo deck extends beyond the rear of the vehicle.

* * * * *